United States Patent
Nakagawa et al.

(10) Patent No.: US 6,658,153 B1
(45) Date of Patent: Dec. 2, 2003

(54) METHOD AND DECODER FOR DECODING COMPRESSED MOVING-PICTURE DATA

(75) Inventors: Satoshi Nakagawa, Tokyo (JP); Yasuko Matsumura, Tokyo (JP); Takashi Nishi, Tokyo (JP); Toshihisa Nakai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/038,136

(22) Filed: Mar. 11, 1998

(30) Foreign Application Priority Data

Mar. 18, 1997 (JP) ............................................. 9-064398

(51) Int. Cl.⁷ ................................................ G06K 9/46
(52) U.S. Cl. .................. 382/233; 382/236; 375/240.25; 375/240.27
(58) Field of Search ................................ 382/232, 233, 382/236, 309; 348/400, 45.2, 699–700; 358/133; 375/240.27–240.28, 240.13, 240.11, 240.23, 240.14–240.15, 240.16, 240.03, 240.25; 709/247; 714/701

(56) References Cited

U.S. PATENT DOCUMENTS

| | | | | |
|---|---|---|---|---|
| 5,168,356 A | | 12/1992 | Acampora et al. ..... | 375/240.15 |
| 5,253,053 A | * | 10/1993 | Chu et al. .............. | 375/240.23 |
| 5,428,396 A | * | 6/1995 | Yagasaki ................ | 375/240.16 |
| 5,455,629 A | * | 10/1995 | Sun et al. .............. | 375/240.27 |
| 5,488,418 A | * | 1/1996 | Mishima ................ | 375/240.11 |
| 5,565,921 A | * | 10/1996 | Sasaki .......................... | 375/409 |
| 5,617,333 A | * | 4/1997 | Oyamada et al. ........... | 709/247 |
| 5,784,494 A | * | 7/1998 | Strongin ..................... | 382/233 |
| 5,809,173 A | * | 9/1998 | Liu ............................. | 382/233 |
| 5,818,967 A | * | 10/1998 | Bhattacharjee ............... | 382/233 |
| 5,831,690 A | * | 11/1998 | Lyons et al. ............ | 375/240.28 |
| 5,835,144 A | * | 11/1998 | Matsumura et al. ... | 375/240.23 |
| 5,847,763 A | * | 12/1998 | Matsumura et al. ... | 375/240.15 |
| 5,847,776 A | * | 12/1998 | Khmelnitsky ............... | 348/699 |
| 5,910,827 A | * | 6/1999 | Kwan et al. ........... | 375/240.27 |
| 5,915,043 A | * | 6/1999 | Ueda .......................... | 382/233 |
| 5,956,429 A | * | 9/1999 | Burns ......................... | 382/245 |
| 6,125,144 A | * | 9/2000 | Matsumura et al. ... | 375/240.12 |

FOREIGN PATENT DOCUMENTS

| | | | |
|---|---|---|---|
| EP | 0 707 425 A2 | 4/1996 | ............ H04N/7/64 |
| JP | 06-004326 | 1/1994 | ............ G06F/11/08 |
| JP | 07-038888 | 2/1995 | ............ H04N/7/24 |
| JP | 08-018980 | 1/1996 | ............ H04N/7/32 |
| JP | 08-111867 | 4/1996 | ............ H04N/7/24 |
| JP | 08-154247 | 6/1996 | ............ H04N/7/32 |

OTHER PUBLICATIONS

Recommendation H.261 of the Telecommunication Standardization Section of the International Telecommunication Union (ITU–T) "Video Codec for Audiovisual Services At p × 64 kbits/s", pp. 1–25, 1994.

* cited by examiner

Primary Examiner—Leo Boudreau
Assistant Examiner—Ishrat Sherali
(74) Attorney, Agent, or Firm—Wenderoth, Lind & Ponack, L.L.P.

(57) ABSTRACT

When a segment of a compressively coded stream of moving-picture data is rendered unusable by an error, usable decoded data are discarded in a range adjacent to the unusable segment, to avoid picture defects that might result from the use of incorrectly decoded data. The discarding range may extend from one end or from both ends of the unusable segment. When the data are coded in two or more different modes, two or more corresponding ranges of different lengths may be set.

14 Claims, 16 Drawing Sheets

FIG. 5
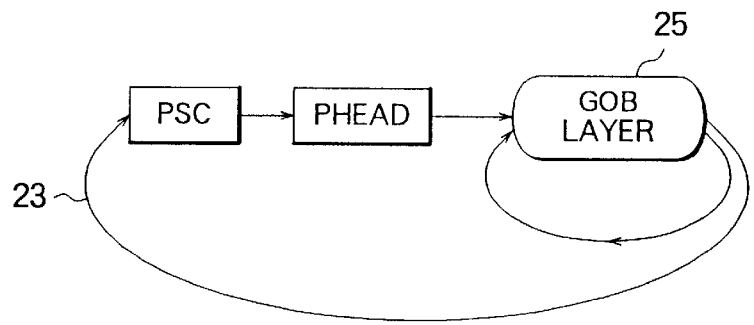
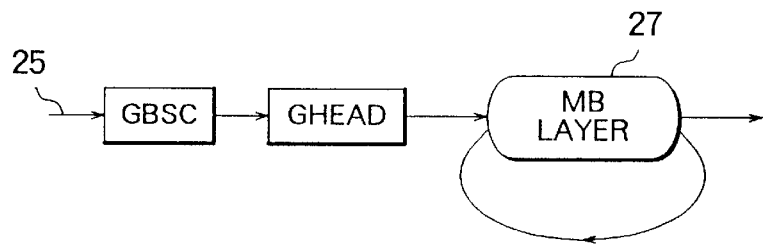
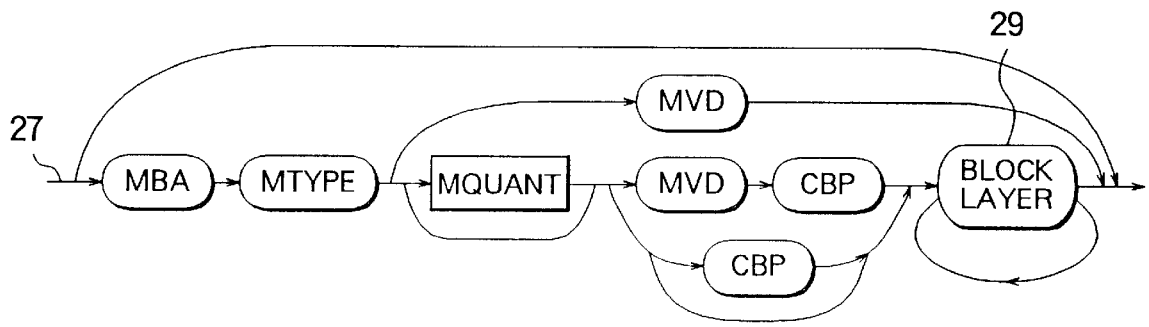
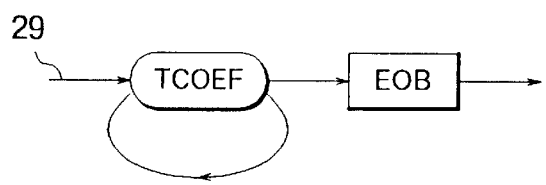

FIG. 6

| MBA | CODEWORD |
|---|---|
| 1 | 1 |
| 2 | 011 |
| 3 | 010 |
| 4 | 0011 |
| 5 | 0010 |
| ⋮ | ⋮ |

| MTYPE | CODEWORD |
|---|---|
| INTRA | 0001 |
| INTRA+Q | 0000001 |
| INTER | 1 |
| INTER+Q | 00001 |
| ⋮ | ⋮ |

| MVD | CODEWORD |
|---|---|
| 0 | 1 |
| 1 | 010 |
| −1 | 011 |
| 2 | 0010 |
| −2 | 0011 |
| ⋮ | ⋮ |

| CBP<br>123456 | CODEWORD |
|---|---|
| 111100 | 111 |
| 000100 | 1101 |
| 001000 | 1100 |
| 010000 | 1011 |
| 100000 | 1010 |
| ⋮ | ⋮ |

| TCOEFF | | CODEWORD |
|---|---|---|
| 0-RUN | LEVEL | |
| 0 | 1 | 110 |
| 0 | 2 | 0100 |
| 0 | 3 | 001010 |
| 0 | 4 | 00001100 |
| 0 | 5 | 001001100 |
| ⋮ | ⋮ | ⋮ |

…
METHOD AND DECODER FOR DECODING COMPRESSED MOVING-PICTURE DATA

BACKGROUND OF THE INVENTION

The present invention relates to a method of decoding compressed moving-picture data, and a decoder employing this method, more particularly to a method and decoder that are suitable when the compressed data contain errors.

Many methods of compressing moving-picture data are known, including methods that employ variable-length codes. For example, Recommendation H.261 of the Telecommunication Standardization Sector of the International Telecommunication Union (ITU-T) specifies a variable-length coding method that divides a video data stream into groups of picture areas, employing a start code to identify the beginning of each group. Each picture area may be coded in either an intra mode or an inter mode. Further details will be given in the description of the invention.

In any method using a variable-length code, when there is an error in the coded data stream, the decoder may lose synchronization with the boundaries of the codewords. The loss synchronization is recognized when the decoder encounters an illegal codeword or some other violation of the coding rules. To minimize picture degradation, a conventional decoder discards all data from the point where the error is recognized up to the next point where synchronization is reliably regained in the H.261 coding scheme, this point is the next start code. The discarded data are replaced by, for example, substituting the decoded data from the preceding frame of the moving picture.

A problem with this is that the decoder may not recognize the loss of synchronization immediately. This occurs when an error turns the intended codeword into another legal codeword having a different length. Sometimes a string of several unintended but legal codewords is produced in this way. The decoder may thus decode a certain amount of data incorrectly without becoming aware of the error, and output the incorrect data under the false assumption that the data were decoded correctly. Use of the incorrectly decoded data can cause severe picture degradation, especially in picture areas coded in the intra mode.

Some variable-length codes have a property so that when boundary synchronization is lost because of an error, correct synchronization is quickly and automatically regained, with a high probability, without the need to wait for the appearance of a special code such as a start code. With these self-resynchronizing codes there is a further problem, however, in that sometimes incorrect synchronization is regained before correct synchronization is regained. Thus after recognizing an error and discarding a certain amount of non-decodable data, the decoder may recognize a legal codeword and be led to assume that resynchronization has occurred, when in fact the recognized codeword consists of pieces of two adjacent codewords. In this case, incorrect data may also be output as if the data were correct.

Problems such as the above are not limited to variable-length codes. In any coding scheme that compresses moving-picture data, when a segment of data is rendered unusable because of an error, there is a danger that usable decoded data preceding or following the unusable segment may have been decoded incorrectly, and that the use of such incorrectly decoded data might cause objectionable picture defects.

SUMMARY OF THE INVENTION

It is accordingly an object of the present invention to prevent the quality of a moving picture from being degraded by unrecognized decoding errors preceding or following a recognized error.

When a segment of a compressively coded data stream representing a moving picture is rendered unusable by an error, the invented decoding method discards a certain amount of decoded data adjacent to the unusable segment, and uses other decoded data to replace the discarded decoded data. The decoded data on one side or both sides of the unusable segment may be discarded.

When data for different picture areas are coded in different modes, the invented method preferably sets a separate discarding range for each mode. When each picture area occupies a single section of the coded data stream, the invented decoding method preferably discards a specified number of decoded picture areas. When each picture area occupies multiple non-contiguous sections in the coded data stream, the invented decoding method preferably discards all decoded data for all picture areas having any coded data in a designated range.

The invented moving-picture decoder comprises a decoding unit that decodes data and recognizes errors, a picture memory for storing the decoded data, and a discarding unit for setting the range or ranges in which decoded data are to be discarded.

BRIEF DESCRIPTION OF THE DRAWINGS

In the attached drawings:

FIG. 5 illustrates a standard video multiplex coding syntax;

FIG. 6 illustrates variable-length coding tables;

DETAILED DESCRIPTION OF THE INVENTION

Embodiments of the invented decoding method will be described with reference to the attached exemplary drawings. First, however, a short description will be given of a standard H.261 video coder-decoder (codec), and of the H.261 coding method. This description is relevant, because the invented decoder can be used to decode an H.261 coded data stream.

Figure 1:
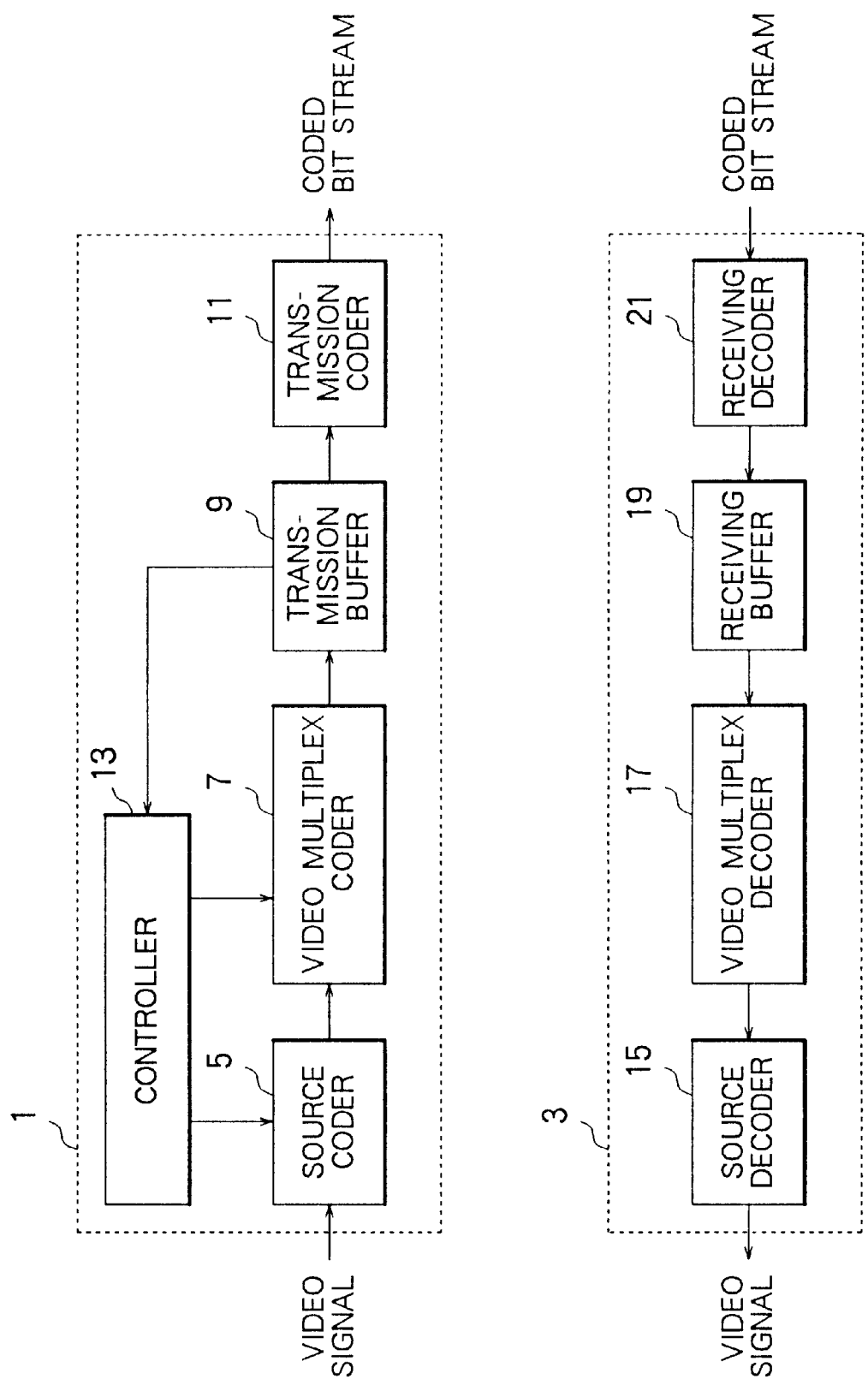
FIG. 1 is a block diagram of a standard video coder and decoder.

FIG. 1 is a block diagram of a video codec as described in ITU-T Recommendation H.261. The codec comprises a video coder 1, which converts a digital video signal to a coded bit stream, and a video decoder 3, which performs the reverse function. The video coder 1 comprises a source coder 5, video multiplex coder 7, transmission buffer 9, transmission coder 11, and controller 13. The video decoder 3 comprises a source decoder 15, video multiplex decoder 17, receiving buffer 19, and receiving decoder 21.

The source coder 5 compresses the digital video signal by various well-known methods, including inter-frame prediction, motion compensation, discrete cosine transform, and quantization. The video multiplex coder 7 further compresses the output of the source coder 5 by zigzag run-length coding and variable-length coding, and adds header information, start codes, and other auxiliary information. The transmission buffer 9 stores the output of the video multiplex coder 7 prior to transmission. The transmission coder 11 frames the data in the buffer 9 for transmission over a communication channel, adds error-correcting codes, adds dummy data if necessary, and outputs the coded bit stream. The controller 13 observes the amount of data in the transmission buffer 9 and controls the source coder 5 and video multiplex coder 7 so as to prevent buffer overflow. The source decoder 15, video multiplex decoder 17, and receiving decoder 21 perform processing reverse to that of the source coder 5, video multiplex coder 7, and transmission coder 11, respectively.

Figure 2:
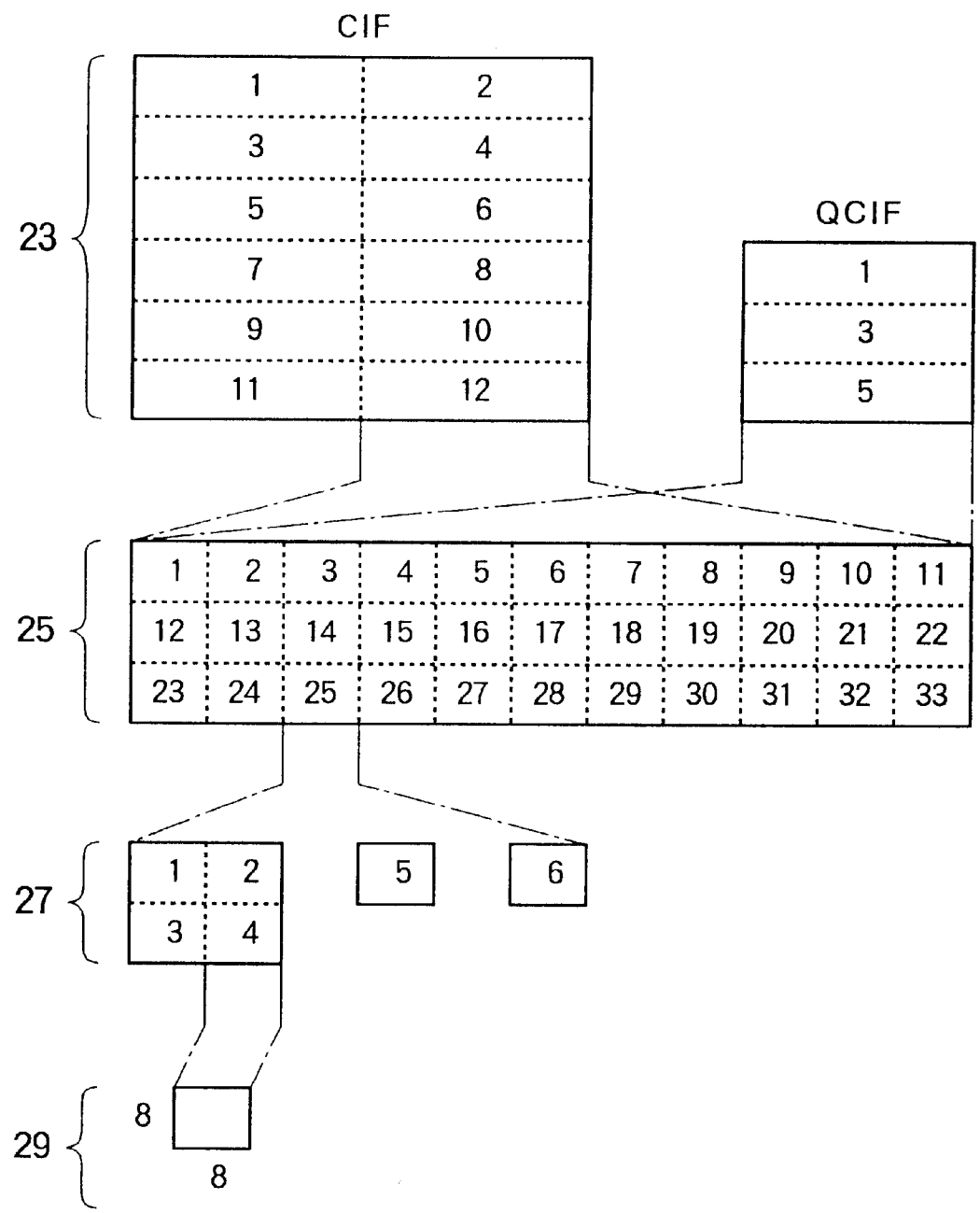
FIG. 2 illustrates a standard hierarchy of moving-picture data.

Referring to FIG. 2, the video signal received by the video coder 1 in FIG. 1 has either the standard common intermediate format (CIF) or quarter common intermediate format (QCIF). Both formats employ a hierarchy having four Layers: a picture layer 23, a group-of-blocks layer 25, a macroblock layer 27, and a block layer 29. A CIF picture has twelve groups of blocks, while a QCIF picture has only three.

Each group of blocks 25 is a rectangular array of macroblocks, numbered by macroblock addresses from one to thirty-three. Each macroblock 27 comprises four luminance blocks (blocks one to four) and two chrominance blocks (blocks five and six). The two chrominance blocks each cover the same picture area as the four luminance blocks combined. A block 29 is an eight-by-eight array of luminance or chrominance values, corresponding to a square picture area with sixty-four luminance or chrominance picture elements. The numbering in FIG. 2 indicates the sequences of the groups of blocks 25, macroblocks 27, and blocks 29 in the coded data stream. Blocks 29 and macroblocks 27 containing no data may be omitted.

Figure 3:
FIG. 3 illustrates a coding sequence of transform coefficients for one block of moving-picture data.

FIG. 3 shows the structure of one block 30 of luminance or chrominance data after execution of the discrete cosine transform in the source coder 5. The sixty-four data values are transform coefficients that represent increasing horizontal spatial frequency from left to right, and increasing vertical spatial frequency from top to bottom. The first transform coefficient or dc coefficient (numbered one in the drawing) represents the average signal level in the block. The transform coefficients are coded in a zigzag order indicated by the numbering in FIG. 3, so that lower-frequency coefficients are coded first. Due to prediction and quantization, most of the coefficients are usually zero, so that the coder 7 codes the length of each run of zeros and the value of the following non-zero coefficient.

Figure 4:
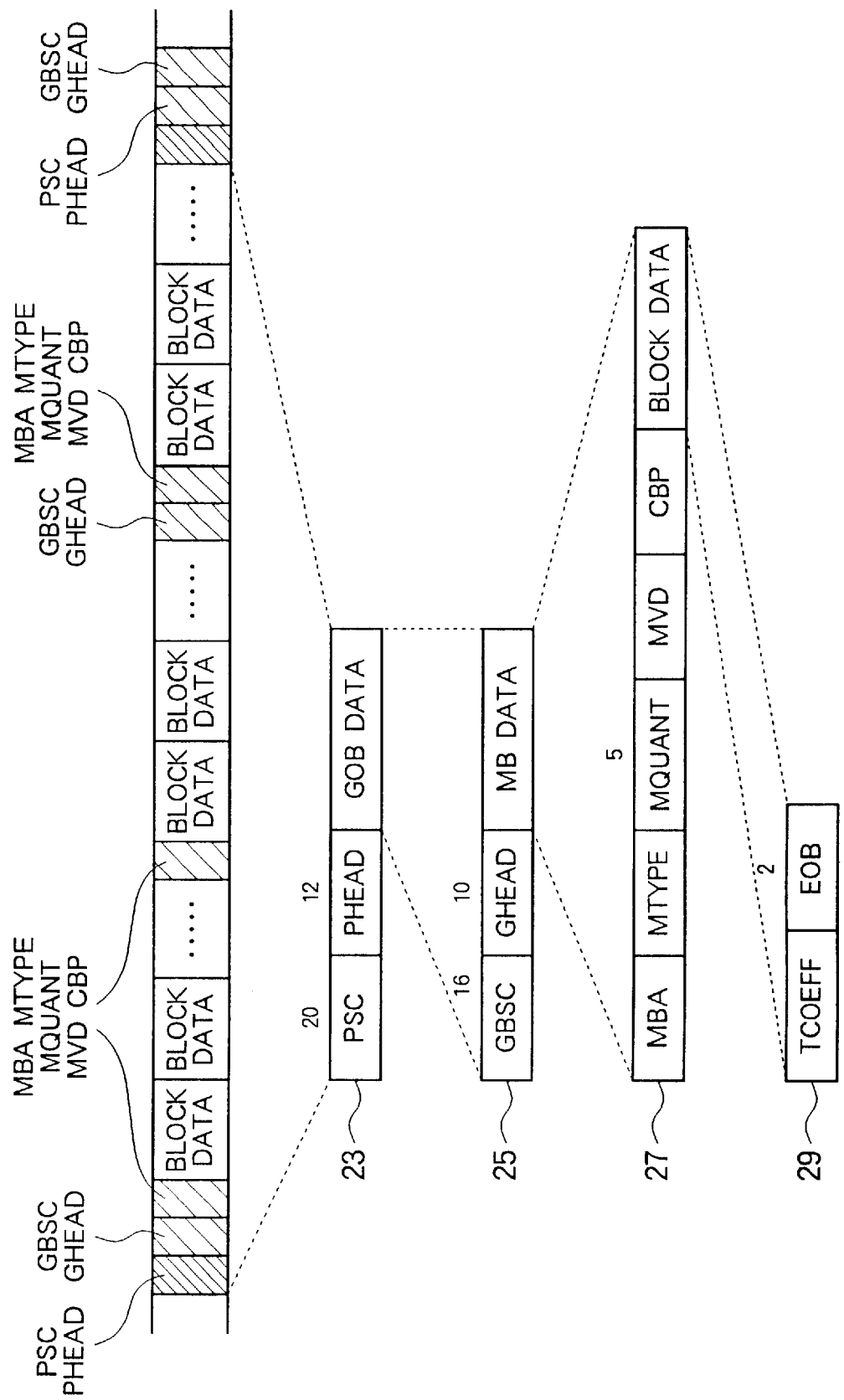
FIG. 4 illustrates the general structure of a coded data stream.

FIG. 4 shows a general structure of a data stream output by the H.261 video multiplex coder 7. The bit lengths of fixed-length items are indicated by numbers over the items. FIG. 5 shows the coding syntax, with fixed-length items enclosed in boxes with square corners and variable-length items in boxes with rounded corners. Table 1 lists the abbreviations used in these drawings.

TABLE 1

| Abbreviations | |
| --- | --- |
| CBP | Coded block pattern |
| EOB | End of block |
| GBSC | GOB start code |
| GHEAD | GOB header |
| GOB | Group of blocks |
| MB | Macroblock |
| MBA | Macroblock address |
| MQUANT | Macroblock quantizer |
| MTYPE | Macroblock type |
| MVD | Motion vector data |
| PHEAD | Picture header |
| PSC | Picture start code |
| TCOEFF | Transform coefficients |

The picture and GOB start codes PSC and GBSC are the following bit strings, which can be unambiguously recognized by the video multiplex decoder 17. The term 'start code' hereinafter will refer to either of these start codes.

PSC: 0000 0000 0000 0001 0000

GBSC: 0000 0000 0000 0001

MTYPE is a variable-length item that indicates whether a macroblock was coded by the source coder 5 in the intra or inter mode. In the intra mode, the actual luminance and chrominance values are coded. In the inter mode, these values are predicted, then the prediction error is coded. For the inter mode, MTYPE also indicates whether or not motion compensation and a loop filter were applied in the prediction process.

Descriptions of the other items in FIGS. 4 and 5 will be omitted, details can be found in ITU-T Recommendation H.261.

FIG. 6 shows part of the variable-length coding tables for the MBA, MTYPE, MVD, CBP, and TCOEFF items. A different variable-length coding rule is used for each of these items. In the MTYPE coding table, '+Q' indicates a macroblock with a new quantization step size, specified by the MQUANT item.

A first embodiment of the invention will now be described with reference to FIGS. 7 to 11. The same general codec structure and hierarchical data structure as shown in FIGS. 1 to 6 will be assumed. Hierarchical layers will be identified by the same reference numerals as in FIG. 2.

Figure 7:
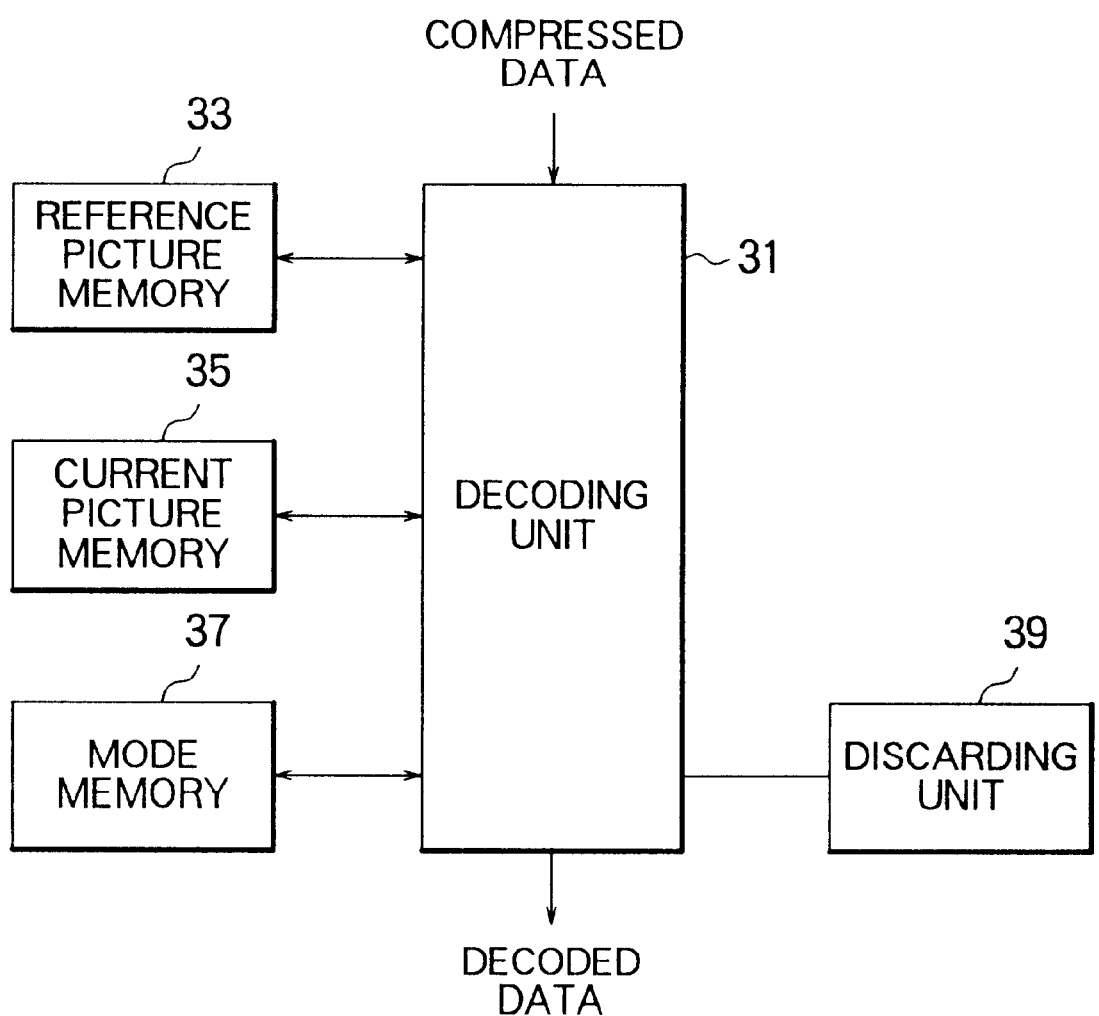
FIG. 7 is a block diagram of a moving-picture decoder according to a first embodiment of the invention.

FIG. 7 shows a moving-picture decoder according to the first embodiment. This decoder performs the functions of the source decoder 15 and video multiplex decoder 17 in FIG. 1. The decoder comprises: a decoding unit 31 that decodes compressed data taken from the receiving buffer 19 in FIG. 1, and outputs the decoded data; a reference picture memory 33 that stores decoded picture data for a previous frame, used for decoding in the inter mode; a current picture memory 35, which is a work area for storage of the frame currently being decoded; a mode memory 37 that stores information indicating the decoding mode (intra or inter) of each macroblock in the current frame; and a discarding unit 39 that decides which decoded data to discard when an error occurs.

When the frame referred to in inter-mode decoding is the immediately preceding frame, the reference picture memory 33 and current picture memory 35 can alternate roles. After the decoding of the current frame has been completed, the current picture memory, in which the decoded data of the current frame are stored, becomes the reference picture memory for the decoding of the next frame, and the reference picture memory, the data in which are no longer needed, becomes the current picture memory for the decoding of the next frame.

Next, the operation of the first embodiment will be described.

The decoding process is carried out by the decoding unit 31 which operates from one synchronization point to the next. A synchronization point is a point at which a start code (PSC or GBSC) is detected. A group of blocks (GOB) is decoded in a single unit of processing. As each macroblock in the group of blocks is decoded, the decoded data are placed in the current picture memory 35, and information indicating whether the macroblock was decoded in the intra mode or inter mode is placed in the mode memory 37.

The decoding unit 31 operates by demultiplexing the incoming stream of compressed and coded data according to the syntax rules illustrated in FIG. 5, recognizing start codes, decoding the fixed-length coded data in each picture header (PHEAD) and GOB header (GHEAD), and decoding the variable-length coded data in the macroblock layer and block layer, in compliance with the coding rules partially illustrated in FIG. 6.

During the decoding of the variable-length data, the decoding unit 31 may encounter a string of bits that does not match any of the expected codewords and therefore cannot be decoded. The decoding unit 31 then recognizes an error. Following the recognition of the error, the decoding unit 31 stops decoding and looks for the next start code in the incoming stream of coded data. The decoding does not resume until the next start code is recognized, normally at the end of the current group of blocks.

When the decoding unit 31 recognizes the next start code after an error, the discarding unit 39 specifies two ranges of decoded macroblock data extending up to the point at which the error was recognized. The first range is a discarding range for macroblocks that were coded in the intra mode (hereinafter, intra macroblocks). The second range is a discarding range for macroblocks that were coded in the inter mode (hereinafter, inter macroblocks).

The decoding unit 31 discards decoded intra macroblocks in the first range, and decoded inter macroblocks in the second range, by deleting these macroblocks from the current picture memory 35. The discarded macroblocks are replaced with the corresponding macroblocks from the reference picture memory 33. The decoding unit 31 also copies macroblocks from the reference picture memory 33 to generate decoded data to take the place of the non-decoded data from the point where the error was recognized up to the next synchronization point.

Figure 8:
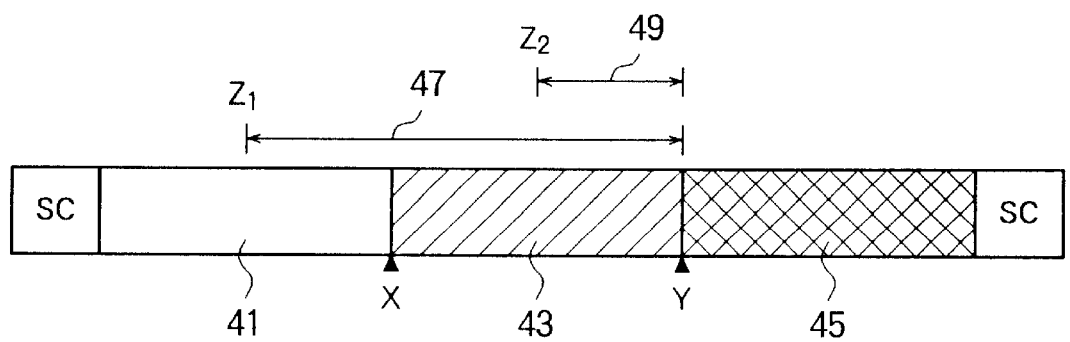
FIG. 8 illustrates the handling of an error in the first embodiment.

FIG. 8 shows an example of a coded data stream with an error, to illustrate the first and second ranges. The error, a transmission channel error, for example, occurs at a point X.

As is almost always the case, the error is not immediately recognized. Recognition takes place at a later point Y, normally the point at which the error first produces an illegal codeword. The decoding unit 31 suspends decoding from point Y until the next start code (SC). The unit of coded data between the two start codes thus comprises a correctly decoded segment 41, an incorrectly decoded segment 43, and a non-decoded segment 45.

The first range 47 specified by the discarding unit 39 extends from the point Y at which the error was recognized back to a first point $Z_1$. The second range 49 extends a shorter distance from point Y back to a second point $Z_2$. In the present example, point $Z_1$ is disposed before the point X of the error, and point $Z_2$ is disposed after point X. Consequently, all incorrectly decoded intra macroblocks, and possibly some correctly decoded intra macroblocks, are discarded, while some incorrectly decoded inter macroblocks may be retained.

Figure 9:
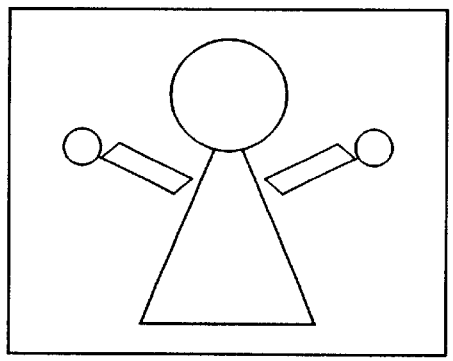
FIG. 9 illustrates an error-free decoded image.
Figure 10:
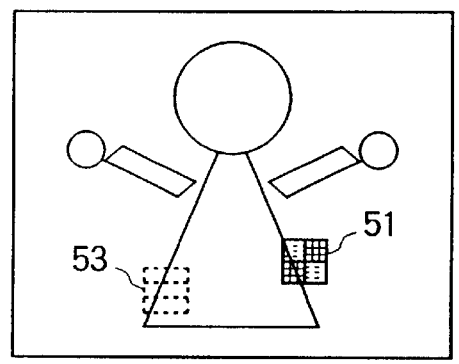
FIG. 10 illustrates a decoded image with errors in two macroblocks.

FIGS. 9 and 10 illustrate the reason for this discarding strategy. FIG. 9 shows a decoded picture that is free of errors. FIG. 10 shows the same decoded picture when typical errors are present in an intra macroblock 51 and an inter macroblock 53. In the incorrectly decoded intra macroblock 51, the picture is completely destroyed. However, in the incorrectly decoded inter macroblock 53, the picture is only slightly damaged, because the coded data in an inter macroblock make comparatively minor modifications to the data predicted from the reference macroblock in the previous frame. The damaged inter macroblock 53 looks like a normal macroblock with a small amount of superimposed noise.

The discarding unit 39 sets the first range 47 to extend sufficiently far back from the point of error recognition so as to catch all of the incorrectly decoded intra macroblocks with substantial certainty, and sets the second range 49 sufficiently short so that only decoded inter macroblocks with a reasonably high probability of being incorrect are discarded. Since the first range is comparatively long, some correctly decoded intra macroblocks may be needlessly replaced, but since intra macroblocks occur relatively infrequently, the amount of picture degradation caused by these needless replacements is slight. Since the second range is comparatively short, some incorrectly decoded inter macroblocks may be allowed through, but this also causes only slight picture degradation. As noted in FIG. 10, most of the decoded data in an inter macroblock is derived from the reference picture, rather than from the coded macroblock itself.

Appropriate rules for setting the first and second ranges can be derived from simulation. The rules may take the values of the decoded data into account. For example, inter macroblocks with large data values may be regarded with greater suspicion than inter macroblocks with small data values.

Next, the decoding of one group of blocks will be described with reference to the flowchart in FIG. 11.

The decoding unit 31 decodes a macroblock in step S101, and decides in step S102 whether the macroblock contained a recognizable error. If not, the decoded macroblock data are stored in the current picture memory 35 in step S103, and the coding mode (intra or inter) of the macroblock is recorded in the mode memory 37 in step S104. The decoding unit 31 then decides in step S105 whether the decoded macroblock was the last macroblock in the group of blocks, in which case the decoding of the group of block ends, or if it was not, the decoding process returns to step S101 to decode the next macroblock.

When an error is recognized in step S102, the decoding unit 31 suspends decoding and proceeds, in step S106, to find the next start code in the coded data stream. Then in step S107, the discarding unit 39 sets the first and second ranges as described above. In step S108, the decoding unit 31 discards decoded intra macroblocks in the first range, and discards decoded inter macroblocks in the second range. In step S109, the decoding unit 31 replaces the macroblocks that were not decoded (step S106), or were decoded and discarded (step S108), with the corresponding macroblocks from the reference picture memory 33.

By following this procedure, the first embodiment reduces the probability of severe picture damage caused by incorrectly decoded intra macroblocks to a negligible level, and avoids using inter macroblocks that have a high probability of having been decoded incorrectly, without excessive sacrifice of correctly coded data.

Next, a second embodiment will be described. The second embodiment assumes the use of a self-resynchronizing variable-length code. The coding rules may differ from those shown in FIGS. 4, 5, and 6. Use of the hierarchical layer structure illustrated in FIG. 2 will still be assumed, although this is not a restriction.

Figure 12:
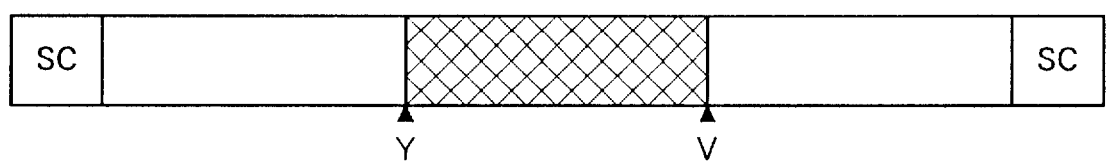
FIG. 12 illustrates resynchronization after an error, when a self-resynchronizing code is employed.

Referring to FIG. 12, when an error is recognized at a point Y in a group of blocks, the properties of the variable-length code enable synchronization with the boundaries of the variable-length codewords to be reestablished at a point V before the next start code. The decoding can resume at this point V, and only the hatched segment between points Y and V is non-decodable.

Synchronization is usually reestablished correctly, but not always, and incorrect resynchronization sometimes occurs. Incorrect resynchronization is usually recognized quickly due to the occurrence of a new error, but it is also possible for incorrect resynchronization to produce a few legal codewords by coincidence, then slip by further coincidence into correct synchronization, before any new error is recognized.

Figure 13:
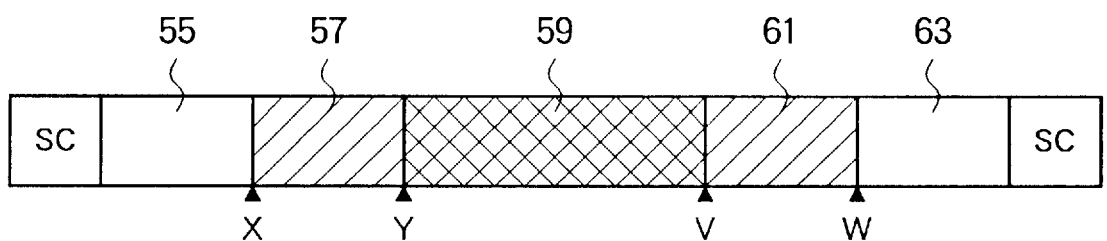
FIG. 13 illustrates segments of correctly and incorrectly decoded data, and non-decodable data.

In addition, synchronization may actually have been lost before point Y. The true situation may accordingly be as depicted in FIG. 13, in which an error occurs at point X but is not recognized until point Y, and synchronization is incorrectly reestablished at point V, then correctly reestablished at point W without the recognition of a new error. The group of blocks is divided by these points into five segments: a correctly decoded segment 55, an incorrectly decoded segment 57, a non-decoded segment 59, another incorrectly decoded segment 61, and another correctly decoded segment 63.

Figure 14:
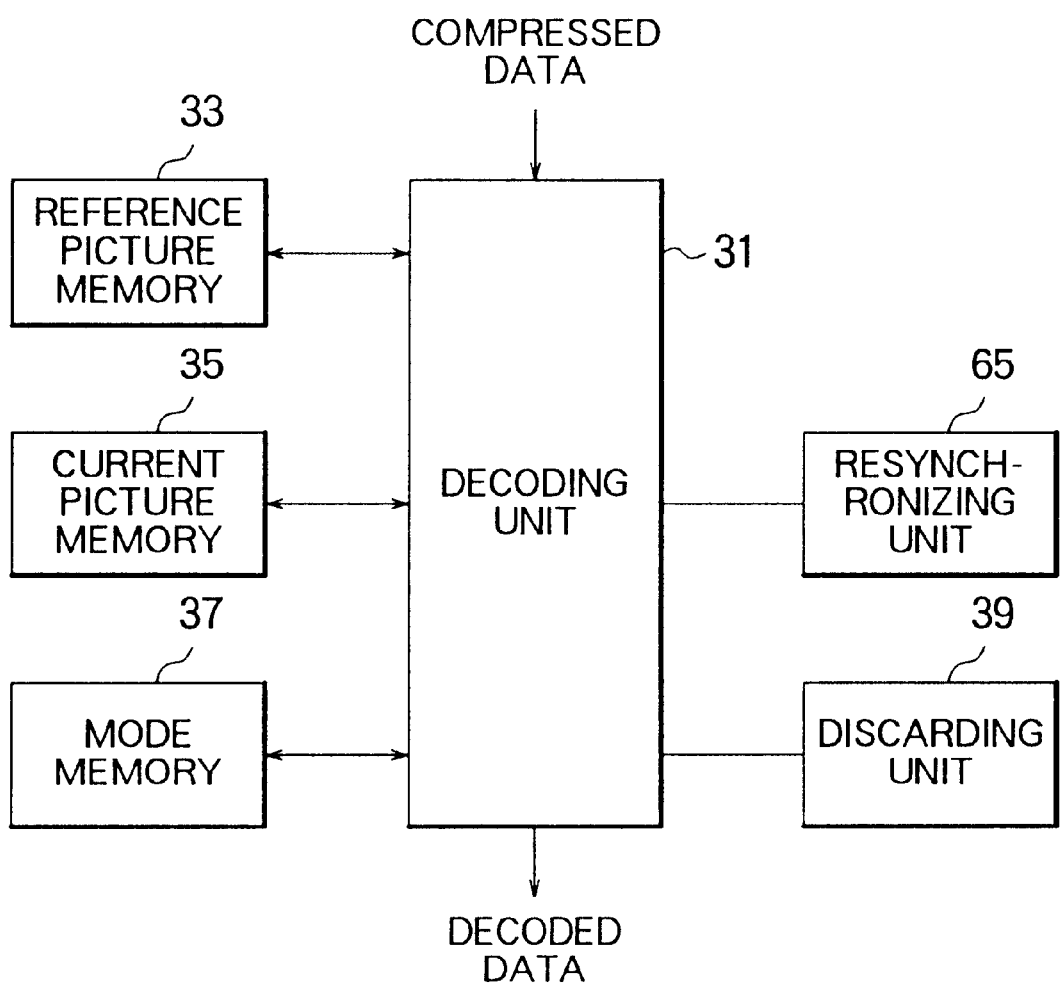
FIG. 14 is a block diagram of a moving-picture decoder according to a second embodiment of the invention.

FIG. 14 shows a block diagram of a moving-picture decoder according to the second embodiment, using the same reference numerals as in FIG. 7 for equivalent parts. The reference picture memory 33, current picture memory 35, and mode memory 37 are identical to the corresponding elements in the first embodiment. The decoding unit 31 and discarding unit 39 are generally similar to the corresponding elements in the first embodiment, with differences in operation that will be described below. A resynchronizing unit 65 supervises the operation of the decoder when an error is recognized.

Figure 15:
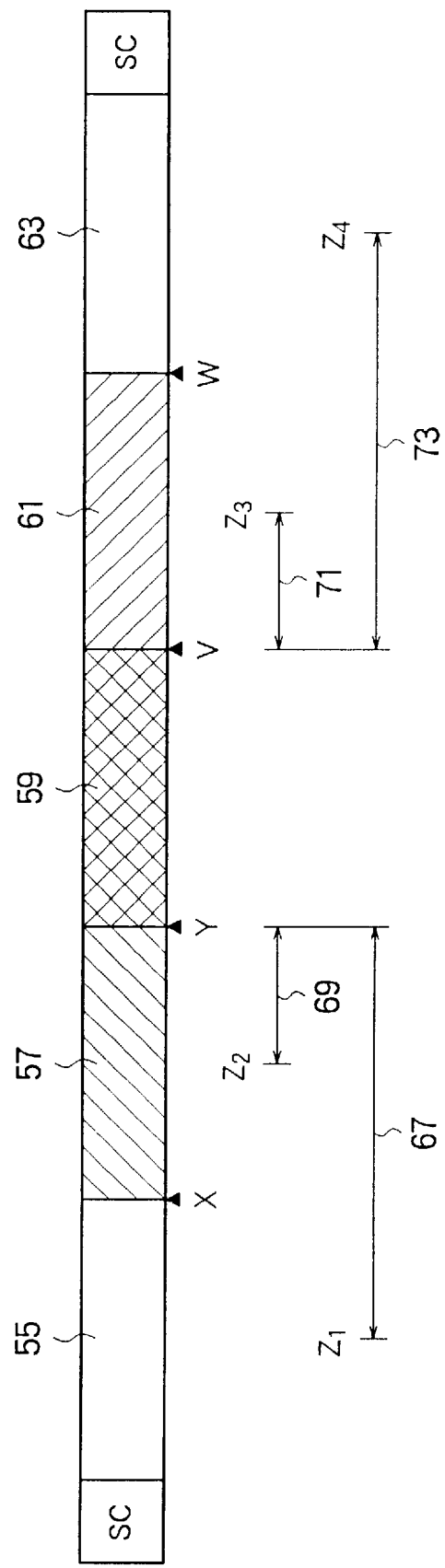
FIG. 15 illustrates the handling of an error in the second embodiment.

FIG. 15 illustrates the operation of the discarding unit 39 in the second embodiment. Points V, W, X, and Y divide the coded group of blocks into five segments 55, 57, 59, 61, and 63 as in FIG. 13. As in the first embodiment, when an error has been recognized at point Y and the next start code has been found, the discarding unit 39 sets a first range 67 extending backward from point Y to point $Z_1$, arid a second range 69 extending backward from point Y to point $Z_2$. In addition, the discarding unit 39 sets a third range 71 and a fourth range 73, extending forward from the resynchronization point V to points $Z_3$ and $Z_4$, respectively.

All data in the non-decodable segment 59 are of course discarded. In addition, decoded intra macroblocks are discarded in the first range 67 and fourth range 73, and decoded inter macroblocks are discarded in the second range 69 and third range 71. The third range 71 is made smaller than the fourth range 73 for the same reason that the second range 69 is smaller than the first range 67.

Although FIG. 15 schematically shows the first and fourth ranges 67 and 73 as having about the same length, the fourth range 73 is preferably shorter than the first range 67, because the interval 61 of unrecognized errors following point V is usually nonexistent. For the same reason, the third range 71 is preferably shorter than the second range 69. As in the first embodiment, rules for setting the ranges can be derived from simulation, and the rules may take the values of the decoded data into account.

Next, the operation of the second embodiment will be described with reference to the flowchart in FIGS. 16 and 17.

Figure 11:
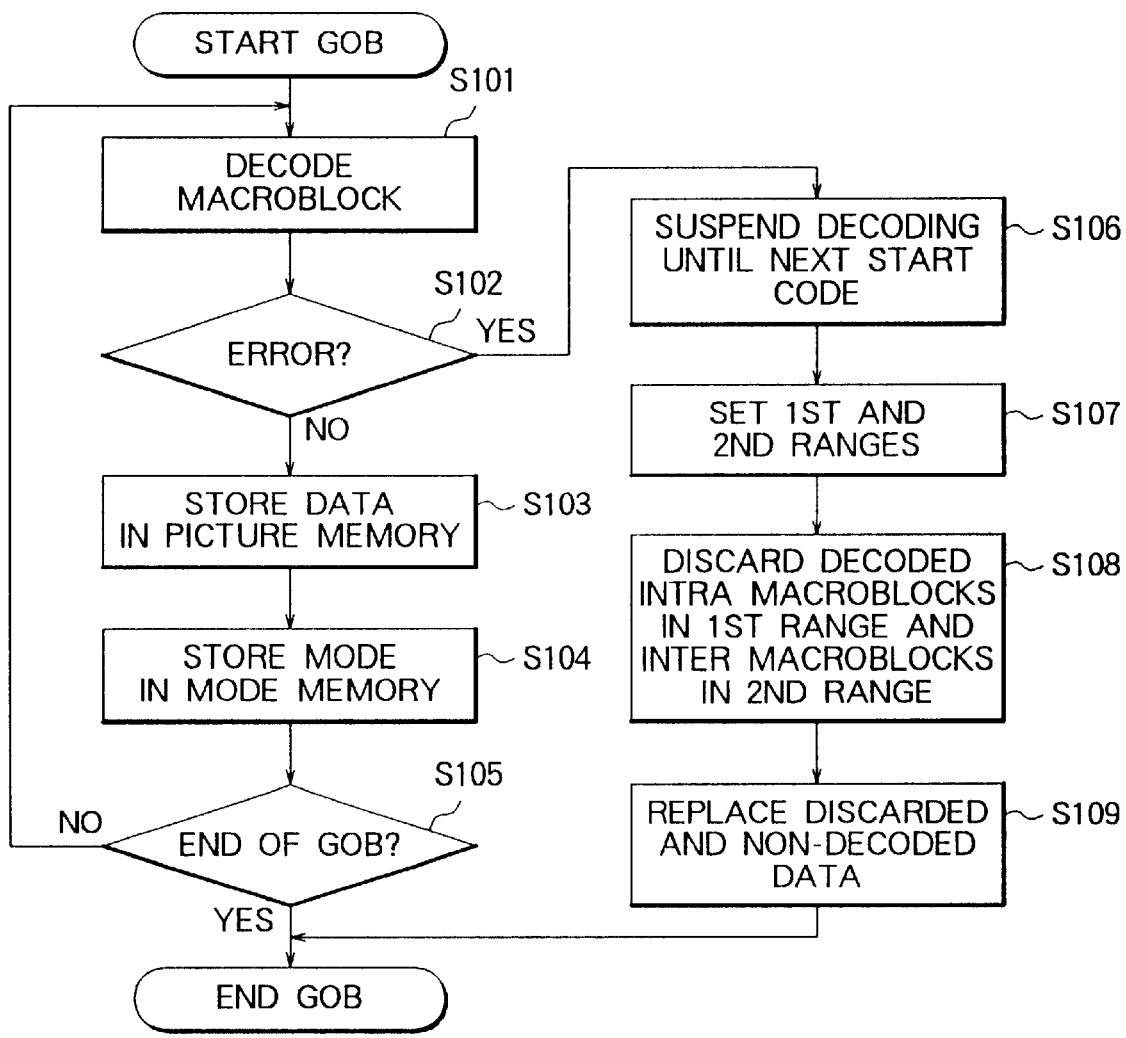
FIG. 11 is a flowchart illustrating the operation of the first embodiment.
Figure 16:
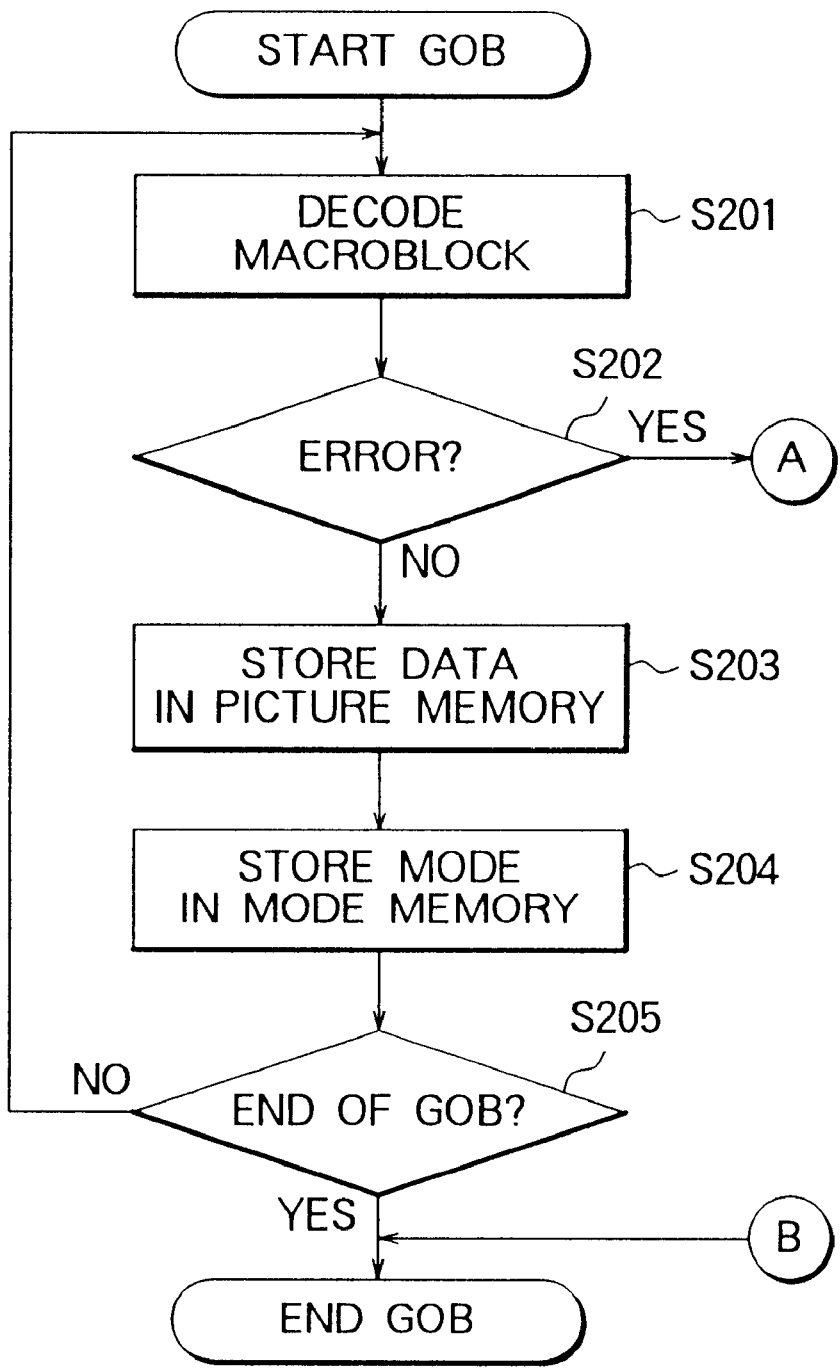
FIGS. 16 and 17 are a flowchart illustrating the operation of the second embodiment.

Steps S201 to S205 in FIG. 16 are identical to the corresponding steps S101 to S105 in FIG. 11. As long as no error is recognized, the decoding unit 31 decodes macroblocks one by one (step S201), places the decoded data in the current picture memory 35 (step S203), and records the mode of each macroblock in the mode memory 37 (step S204).

Figure 17:
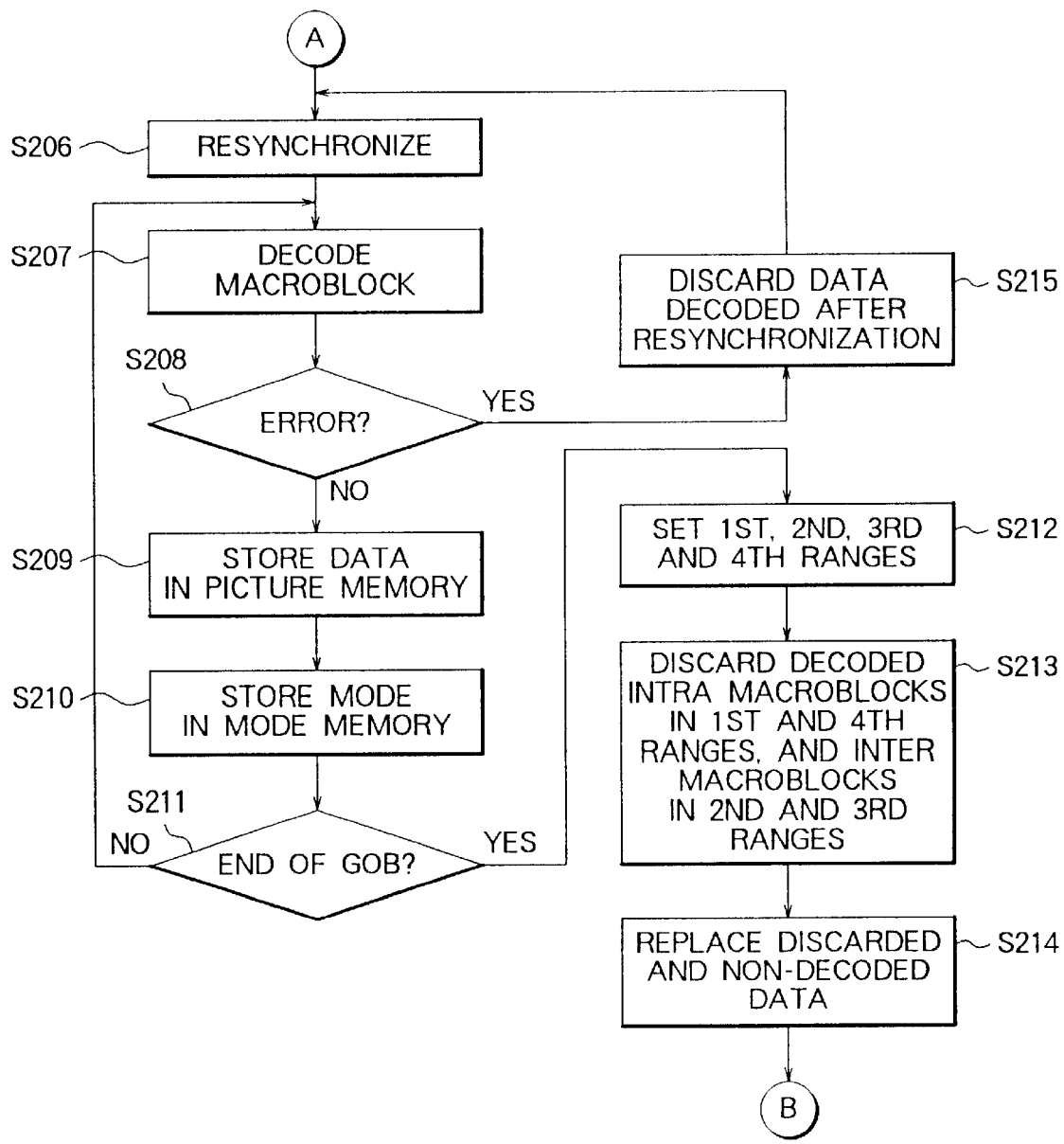

When an error is recognized in step S202, processing branches to FIG. 17. Under the supervision of the resynchronizing unit 65, the decoding unit 31 continues to attempt to decode the data, proceeding bit by bit until a legal codeword is recognized and synchronization is reestablished (step S206). The resynchronizing unit 65 then directs the decoding unit 31 to enter the loop comprising steps S207 to S211, which are substantially identical to steps S101 to S105 in FIG. 11. As long as no new error is recognized, the decoding unit 31 again decodes macroblocks one by one (step S207), places the decoded data in the current picture memory 35 (step S209), and records the mode of each macroblock in the mode memory 37 (step S210).

If a new error is recognized in step S208, then in step S215, the resynchronizing unit 65 directs the decoding unit 31 to discard all macroblocks containing data from the point at which synchronization was reestablished up to the point of the new error. This step is taken, in part, to guard against incorrect resynchronization. Also, depending on the way in which the macroblocks are coded, when two errors are recognized in the same group of blocks, all macroblock data between the two errors may be unusable even if some of the data can be correctly decoded. This situation can occur due to differential coding of macroblock addresses, for example.

Following step S215, a return is made to step S206, and the resynchronization process is repeated.

When the end of the group of blocks is recognized in step S211, the discarding unit 39 sets the first, second, third, and fourth ranges in step S212. In step S213, the decoding unit 31 discards the decoded intra macroblocks from the first range and fourth range, and discards the decoded inter macroblocks from the second range and third range. In step S214, these discarded macroblocks are replaced in the current picture memory 35 with the corresponding macroblocks from the reference picture memory 33. Other macroblocks that were discarded in step S215, or could riot be decoded because synchronization was lost, are similarly replaced.

The decoding process then returns to the bottom of FIG. 16 and ends.

Depending on the way in which the macroblocks are coded, further decoding steps may be needed, such as a step to recover differentially decoded macroblock addresses by working backward from the end of the group of blocks. These further steps have been omitted to avoid obscuring the invention with irrelevant detail.

The second embodiment extends the effects of the first embodiment to cover both the interval before the first error is recognized in a group of blocks, and the interval following final resynchronization, after the last recognized error in the group of blocks. Discarding all intra macroblocks from the first and fourth ranges reduces the probability of using an incorrectly decoded intra macroblock to a negligible level. Discarding all inter macroblocks from the second and third ranges avoids use of the decoded inter macroblocks that are most likely to have been decoded incorrectly, without discarding too many correctly decoded inter macroblocks.

In setting the first, second, third, and fourth ranges in the preceding embodiments, the discarding unit 39 can specify distances from the points X and V in various ways. Examples will be given in the third and fourth embodiments below. The third embodiment is applicable when each macroblock occupies a single continuous section in the stream of coded data, as implied by the coding syntax in FIG. 5, for example. The fourth embodiment is applicable when a macroblock may occupy two or more non-contiguous sections in the stream of coded data.

Figure 18:
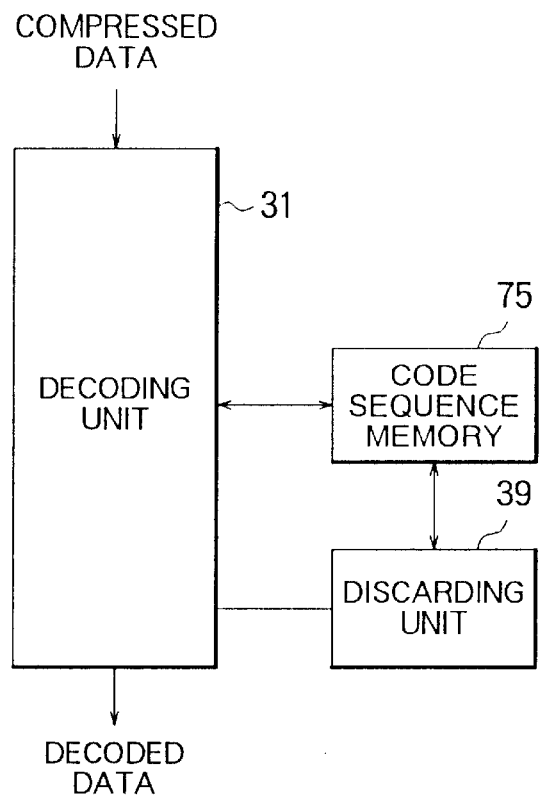
FIG. 18 is a block diagram showing a part of a moving-picture decoder according to a third embodiment of the invention.

FIG. 18 shows the relevant parts of a moving-picture decoder according to the third embodiment. The decoding unit 31 and discarding unit 39 are similar to the corresponding elements in the first or second embodiment. A code sequence memory 75 stores information specifying the sequence in which macroblocks appear in the coded data stream. This sequence is, for example, the sequence in which the macroblocks were transmitted over a communication channel.

Other elements present in the first or second embodiment are also present in the third embodiment, but have been omitted to simplify the drawing.

Figure 19:
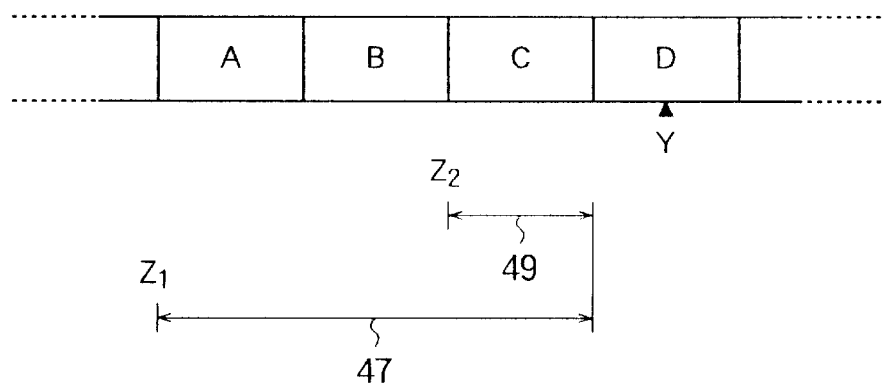
FIG. 19 illustrates the handling of an error in the third embodiment.

FIG. 19 illustrates a stream of coded data in the third embodiment, showing macroblocks A, B, C, and D in the order specified in the code sequence memory 75. Each macroblock is coded in a single section of coded data. The decoding unit 31 recognizes an error at point Y in macroblock D, making this macroblock non-decodable.

The discarding unit 39 specifies that a first range 47 extends three macroblocks back from the first non-decodable macroblock D. In other words, the range in which intra macroblocks will be discarded covers macroblocks A, B, and C. A second range 49 extends only one macroblock back from the first non-decodable macroblock D, so the range in which inter macroblocks will be discarded includes only macroblock C. The instructions given by the discarding unit 39 to the decoding unit 31 are, for example, to discard block C unconditionally, and to discard blocks B and A if they are intra macroblocks.

When a self-resynchronizing code is employed, the discarding unit 39 sets third and fourth ranges similarly, e.g. by instructing the decoding unit 31 to discard a first number of complete macroblocks following the resynchronization point unconditionally, and to discard intra macroblocks occurring among a second number of complete macroblocks following the resynchronization point. The first number may be zero.

The third embodiment operates as described in the flowcharts for the first or second embodiment, with the addition of a step of storing the sequence in which macroblocks appear in the coded data stream in the code sequence memory 75. This step can be inserted after step S104 in FIG. 11, for example, or after step S204 in FIG. 16 and after step S210 in FIG. 17. In setting ranges in steps S107 and S212, the discarding unit 39 refers to the sequence information stored in the code sequence memory 75.

The third embodiment has the advantage that the discarding unit 39 can give the decoding unit 31 simple instructions, which the decoding unit 31 can easily carry out. The decoding unit 31 and discarding unit 39 do not have to know the exact locations of points $Z_1$, $Z_2$, $Z_3$, and $Z_4$ in the coded data stream; they only have to count decoded macroblocks stored in the current picture memory 35, in the order given in the code sequence memory 75.

If the macroblocks always appear in the same predetermined sequence in the coded data stream, the code sequence memory 75 can be omitted.

Figure 20:
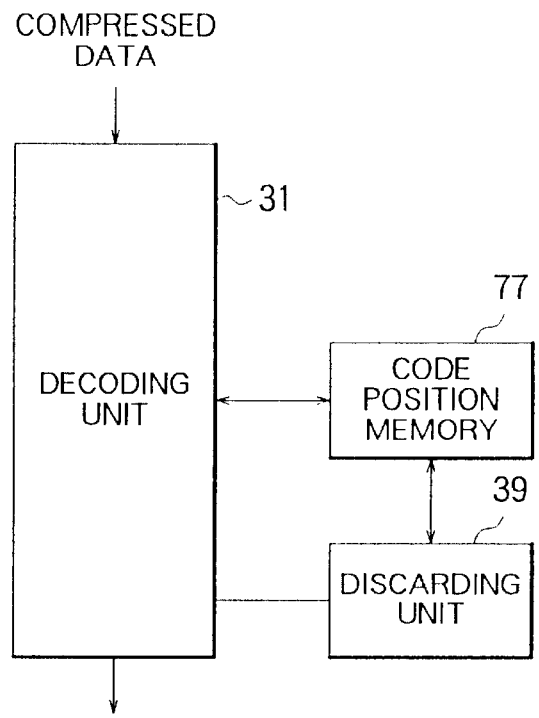
FIG. 20 a block diagram showing a part of a moving-picture decoder according to a fourth embodiment of the invention.

FIG. 20 shows the relevant parts of a picture decoder according to the fourth embodiment. The decoding unit 31 and discarding unit 39 are again similar to the corresponding elements in the first or second embodiment. A code position memory 77 stores information specifying the relative positions of sections of coded data belonging to each macroblock in the received stream of coded picture information. Other elements present in the first or second embodiment are also present in the fourth embodiment, but have been omitted to simplify the drawing.

Figure 21:
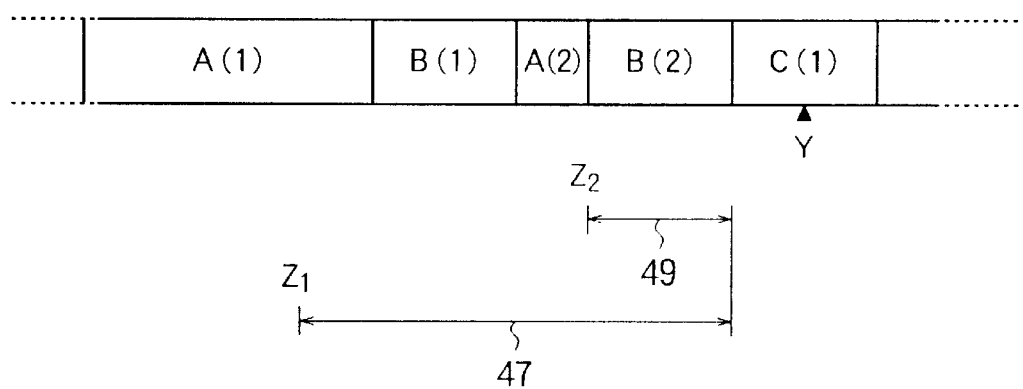
FIG. 21 illustrates the handling of an error in the fourth embodiment.

FIG. 21 illustrates a part of a stream of coded data in the fourth embodiment. The coded data for each macroblock appear in two separate sections, with sections belonging to different macroblocks interleaved as shown. An error is recognized at point Y in section C(1) of macroblock C.

The discarding unit 39 sets a first range extending back to a point $Z_1$ a certain number of codewords before point Y, and sets a second range extending a lesser number of codewords back from point Y to a point $Z_2$. Referring to the information stored in the code position memory 77, the discarding unit 39 instructs the decoding unit 31 to discard intra macroblocks including any coded data disposed between point $Z_1$ and point Y, and to discard all macroblocks including any coded data disposed between point $Z_2$ and point Y. In FIG. 21, macroblock A is discarded if it is an intra macroblock, and macroblock B is discarded unconditionally.

When a self-resynchronizing code is employed, the discarding unit 39 decides in a similar manner which macroblocks should be discarded unconditionally following the resynchronization point, and which macroblocks should be discarded if they are intra macroblocks.

The fourth embodiment operates as described in the flowcharts for the first or second embodiment, with the addition of a step of storing sections of macroblock data temporarily until an entire macroblock has been received, and a step of storing relative position information for the individual macroblock sections in the code position memory 77. These steps can be inserted before step S101 in FIG. 11, for example, or before step S201 in FIG. 16 and before step S207 in FIG. 17. In steps S107 and S212, the discarding unit 39 refers to the information stored in the code position memory 77. The code position memory 77 can also be used as a temporary store for macroblock data awaiting decoding.

Like the third embodiment, the fourth embodiment has the advantage that the discarding unit 39 can give the decoding unit 31 simple instructions, which the decoding unit 31 can easily carry out.

Although the preceding embodiments have been described in relation to the layer structure of macroblocks and groups of blocks shown in FIG. 2, the invention is not limited to this particular structure. The preceding embodiments can be employed with any coding scheme that divides a picture into separate areas in some way, and selects between the intra and inter coding modes on an area-by-area basis.

The coded data stream need not include embedded start codes. Synchronization can be established by other means, including means in a layer lower than the coded data layer.

The detection of errors is not limited to the detection of illegal codewords. Syntax errors may also be recognized, for example, and parity bits or other error-detecting codes may be employed.

The preceding embodiments are only one illustration of the inventive concept of discarding decoded picture data preceding or following data rendered unusable by an error. This concept can be applied regardless of the number or types of different coding and decoding modes. For example, the invention can be practiced when all picture data are coded in the intra mode. The invention can also be practiced with more than two different modes, a different range being set for the discarding of data decoded in each mode.

The invention can be practiced in hardware, in software, or in a combination thereof.

Those skilled in the art will recognize that further modifications can be made within the scope claimed below.

What is claimed is:

1. A method of decoding a coded data stream representing a moving picture when it is evident that a first segment of the coded data stream cannot be decoded to obtain a correct moving picture because of an error occurring on a transmission medium, said method comprising:

defining a second segment of the coded data stream adjacent to the first segment as a discardable segment, even though it is not evident that the second segment cannot be decoded to obtain a correct moving picture; and using data decoded from parts of the coded data stream other than the first and second segments in place of data decoded from the first and second segments.

2. The method of claim 1, wherein the first segment begins at a point at which the error is recognized, and the second segment precedes the point.

3. The method of claim 1, wherein the coded data stream is coded using a self-resynchronizing variable-length code, the first segment ends at a resynchronization point, and the second segment follows the resynchronization point.

4. The method of claim 1, wherein the coded data stream is coded in a plurality of modes, and the second segment has different lengths in different modes of the plurality of modes.

5. The method of claim 4, wherein the plurality of modes includes an inter mode and an intra mode, and said defining operation further comprises:

setting a first range, adjacent to the first segment, in which to discard decoded data that was coded in the intra mode; and setting a second range, smaller than the first range and also adjacent to the first segment, in which to discard decoded data that was coded in the inter mode.

6. The method of claim 1, wherein the moving picture is coded in a series of sections containing data for respective picture areas, the data for each picture area being contained in a single section, and said defining operation further comprises specifying a certain number of the picture areas.

7. The method of claim 1, wherein the moving picture is coded in a series of sections containing data for different picture areas, the data for each picture area being contained in a plurality of non-contiguous sections, and said defining operation further comprises:

setting a range of coded data adjacent to the first segment; and discarding all decoded data belonging to all picture areas having any coded data within the range.

8. A moving picture decoder for decoding a coded data stream representing a moving picture, the coded data stream being received from a picture coder via a transmission medium, the moving picture decoder comprising:

a decoding unit operable to decode the coded data stream and to detect errors in the coded data stream;

a picture memory coupled to said decoding unit, said picture memory being operable to store decoded data produced by said decoding unit; and a discarding unit coupled to said decoding unit and operating when an error detected by said decoding unit makes a non-decoded segment of the coded data stream unusable, said discarding unit being operable to set a range of suspected incorrectly decoded data adjacent to the non-decoded segment in the coded data stream, cause said decoding unit to discard the decoded data in the range from said picture memory, and cause said decoding unit to replace the decoded data thus discarded and the non-decoded segment by using other decoded data.

9. The moving picture decoder of claim 8, wherein the non-decoded segment begins at a point at which the error is recognized, and said discarding unit causes said decoding unit to discard decoded data preceding the point.

10. The moving picture decoder of claim 8, wherein the coded data stream is coded using a self-resynchronizing variable-length code, the non-decoded segment ends at a resynchronization point, and said discarding unit causes said decoding unit to discard decoded data following the resynchronization point.

11. The moving picture decoder of claim 8, wherein the coded data stream is coded in a plurality of modes, and said discarding unit sets a separate range for discarding decoded data that was coded in each of the plurality of modes.

12. The moving picture decoder of claim 11, wherein the plurality of modes includes an inter mode and an intra mode, said discarding unit sets a first range in which to discard decoded data that was coded in the intra mode, and said discarding unit sets a second range, smaller than the first range, in which to discard decoded data that was coded in the inter mode, the first range and the second range both being adjacent to the non-decoded segment.

13. The moving picture decoder of claim 8, wherein the moving picture is coded in a series of sections containing data for respective picture areas, the data for each picture area being contained in a single section, and said discarding unit sets the range by specifying that decoded data for a certain number of the picture areas is to be discarded.

14. The moving picture decoder of claim 8, wherein the moving picture is coded in a series of sections containing data for different picture areas, the data for each picture area being contained in a plurality of non-contiguous sections, and said discarding unit causes said decoding unit to discard all decoded data belonging to all picture areas having any decoded data within the range.

* * * * *